Aug. 8, 1939.   P. R. TORRES   2,169,171
GEARING FOR BICYCLES
Filed July 26, 1937   2 Sheets-Sheet 1

Pastor Reyes Torres
INVENTOR
BY Victor J. Evans & Co.
ATTORNEYS

Aug. 8, 1939.  P. R. TORRES  2,169,171
GEARING FOR BICYCLES
Filed July 26, 1937    2 Sheets-Sheet 2
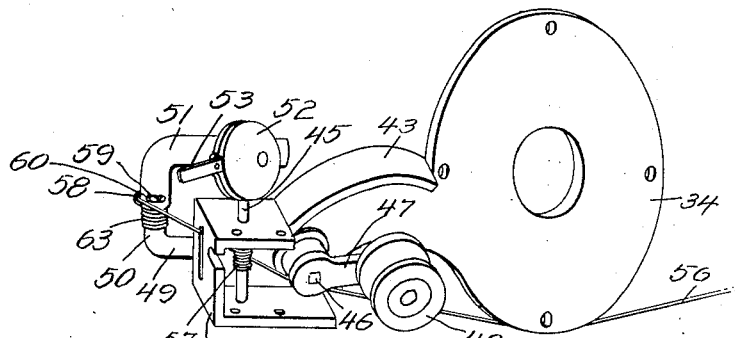
Pastor Reyes Torres
INVENTOR
BY Victor J. Evans & Co.
ATTORNEYS Patented Aug. 8, 1939

2,169,171

UNITED STATES PATENT OFFICE 2,169,171

GEARING FOR BICYCLES

Pastor Reyes Torres, Mandaluyong, Rizal, P. I.

Application July 26, 1937, Serial No. 155,782

2 Claims. (Cl. 74—280)

The invention relates to gearing for bicycles and more especially to change speed mechanism and brake and alarm controls.

The primary object of the invention is the provision of a bicycle of this character, wherein the same is susceptible of operation at different speeds through the medium of change speed mechanism so that such bicycle when operated can be propelled at different or varying speeds according to the desire of the rider of the same.

Another object of the invention is the provision of a bicycle of this character, wherein through a control the speed of travel thereof can be regulated through braking means and at the same time a signal or alarm can be simultaneously actuated thus notifying pedestrians or traffic of the approach of the bicycle to eliminate collisions or accidents, the brake means being positive and dependable.

A further object of the invention is the provision of a bicycle of this character, wherein the construction is novel in its entirety and is readily and easily controlled for regulating the speed of travel thereof, conveniently braked and assured of effecting a warning or signal when in use.

A still further object of the invention is the provision of a bicycle of this character, which is simple in its construction, thoroughly reliable and effective in operation, neat in appearance, strong, durable, and inexpensive to manufacture.

With these and other objects in view, the invention consists in the features of construction, combination and arrangements of parts as will be hereinafter more fully described, illustrated in the accompanying drawings, which disclose the preferred embodiment of the invention and pointed out in the claims hereunto appended.

In the accompanying drawings:

Figure 4 is a perspective view of the brake and alarm mechanism.

Figure 5 is a vertical transverse sectional view through the bicycle.

Figure 6 is a fragmentary side elevation partly in section showing the brake applied.

Figure 7 is a perspective view of one of the train of gears.

Figure 8 is a fragmentary perspective view of one of the pedal cranks of the bicycle.

Figure 9 is a fragmentary perspective view of the main sprocket wheel and adjuncts.

Similar reference characters indicate corresponding parts throughout the several views in the drawings.

Figure 1:
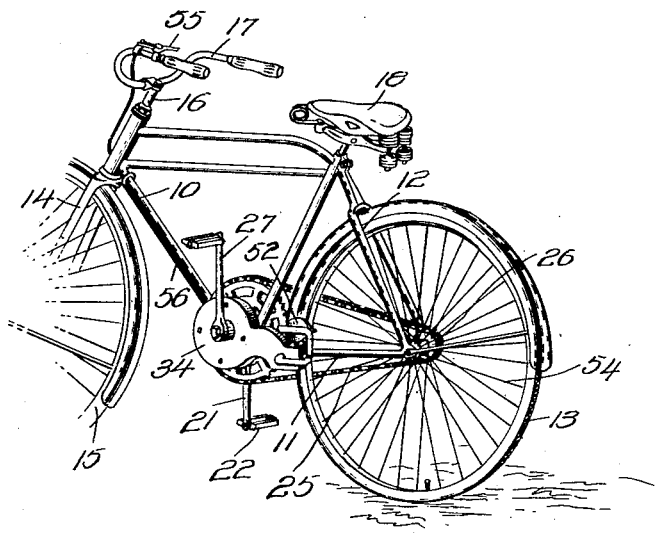
Figure 1 is a fragmentary perspective view of the bicycle constructed in accordance with the invention.
Figure 2:
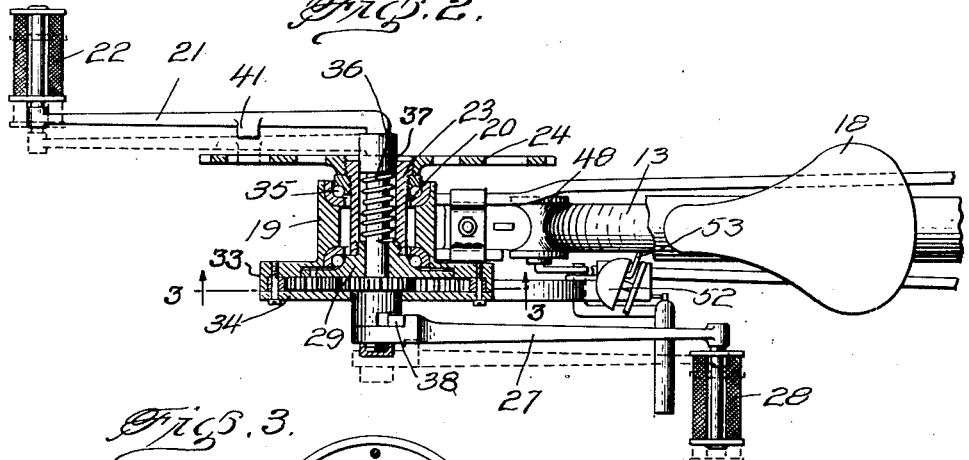
Figure 2 is an enlarged fragmentary horizontal sectional view thereof, certain portions of the bicycle being shown in top plan.
Figure 3:
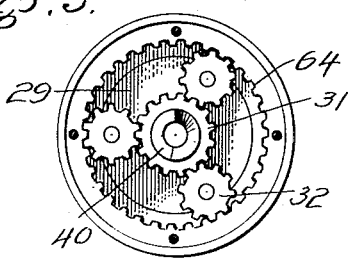
Figure 3 is a sectional view thereof.

Referring to the drawings in detail, the bicycle comprises, as is usual, a frame 10 which in its rear forks 11 and 12, respectively, has arranged a rear driving wheel 13 while in the front steering fork 14 is a front steering wheel 15, a steering stem 16 which carries handle bars 17 as is usual. The seat of the bicycle is indicated at 18 and is of any conventional type.

The frame is formed with an axle housing 19 accommodating therein the axle end 20 of a pedal crank 21, the pedal being indicated at 22 for the latter. Loose upon the axle end 20 within the housing 19 is a sprocket hub 23 having detachably threaded thereon at one end the main driving sprocket 24 over which is trained a sprocket chain 25 which is also trained over a sprocket gear 26 fixed to the rear wheel 13 as is customary.

Detachably fixed to the axle end 20 is the other pedal crank 27 carrying a pedal 28. The sprocket gear 24 is at one end of the hub 23 while at the other end is fixed a disk 29. The axle end 20 has loose thereon the hub portion 30 of a gear 31 which is enmesh with planetary pinions 32 concentrically thereof, these being journalled on the disk 29 which is counterseated in a casing 33 formed on the housing 19 at the side of the bicycle frame 10 opposite the sprocket gear 24 and which casing is fitted with a removable cover or face plate 34. The hub 23 fitting the housing has coacting therebetween the usual antifriciton ball or roller bearings 35.

Surrounding the axle end 20 within the hub 23 is a coiled expansion spring 36, one end playing against an abutment 37 on the said axle end and the opposite end seated against the disk 29. The pedal crank 27 is formed with a latching lip 38 for engaging with an abutment shoulder 39 on the hub portion 30 of the gear 31 thus locking the said gear with the axle end 20 under the tension of the spring 36. Next to the shoulder 39 and formed with the hub portion 30 of the gear 31 is a cam face 40 coacting with the lip 38 so that when the pedal cranks 21 and 27 are at a standstill this lip 38 will ride the cam face 40 disengaging the lip 38 from the shoulder 39 and thereby freeing the gear 31 on the axle end 20. This axle end 20 under such condition moves laterally in the hub 23. The pedal crank 21 is formed with a latching jaw 41 which is adapted to engage with any one of the spokes 42 of the main sprocket gear 24 when this lateral movement of the axle end 20 takes place and thus locking the hub 23 carrying the sprocket 24 directly with the axle end 20. When the said sprocket gear 24 is latched with the pedal crank 21, the driving speed of the wheel 13 will be at the maximum and when the lip 38 engages with the shoulder 39 and the sprocket gear 24 is unlatched from the latching hook 41 the speed of driving of the wheel 13 is reduced according to the ratio of the gearing 31 and 32. Thus it will be seen that the wheel 13 can be driven at high speed when the sprocket 24 is engaged by the latching hook 41 or at low speed when the lip 38 is engaged with the shoulder 39 on the hub portion 30 of the gear 31.

The cover or face plate 34 is formed with an extension 43 creating a boxing 44 and journaled vertically in this boxing rearwardly of the casing 33 is a turning post 45, while horizontally journaled in the boxing 44 is a double crank axle 46, the crank 47 of which carries a peripherally grooved braking roller 48 adapted for engaging the rear wheel at its tired periphery for braking purposes. The other crank 49 of said axle 46 is formed with a pivot lug 50 for mounting thereon of a swinging elbow 51 which is adapted to be swung from a position clearing the crank 27 into the path thereof when making a down stroke and in this position will effect the application of the brake roller 48 for braking purposes on the rear wheel 13 of the bicycle.

The post 45 carries a bell 52 having a clapper 53 which is adapted to swing into the path of the spokes 54 of the rear wheel 13 so that when the latter rotates, the clapper 53 is actuated for the sounding of the bell 52 for signaling purposes.

On the handle bar 17 is fixed a finger actuated control 55 to which is connected a pull cable 56, the same being tightly twisted at 57 about the post 45 and is connected at 58 with the elbow 51, the latter being limited in its swinging movement by a stop pin 59 operating within a slot 60 formed in the elbow, the pin 59 being fixed in the stud 50 of the crank arm 49. Thus when pull is made upon the cable 56, the post 45 is turned by the twist 57 and simultaneously therewith the elbow is swung into the path of movement of the crank 27 and when the latter is depressed against the elbow 51, the brake roller 48 is brought into braking position on the wheel 13 while the clapper 53 is moved into the path of the spokes 54 for the automatic sounding of the bell 52. Normally the elbow 51 is swung inwardly clear of the crank 27 and the clapper 53 is swunk out of the path of the spokes 54 of the wheel 13.

A closure plate 61 is detachably fitted with the boxing 44 to conceal the parts interiorly thereof and this closure plate 61 affords one of the bearings for the axle 46. A wedging shoe 62 overhangs the brake roller 48 and is suitably fastened with the rear fork 11 of the frame 10 of the bicycle in proper position and coacts with this roller 48 for wedging purposes to effect the positive braking of the wheel 13 when the said roller 48 has made contact with the tired wheel.

Under normal pedaling of the bicycle the train of gearing 31 and 32 will be active for the driving of the wheel 13 at low speed. In this instance the pedal 27 having the latching lip 41 will be locked by the latter with the hub 30 of the gear 31 through contact with the shoulder or abutment 39 on said hub 30. Now by back pedaling or holding the pedals by the feet of the rider of the bicycle the lip 38 rides the cam 40 on the hub 30 of the gear 31 and thus laterally shifts the crank axle 20 in the hub 23 against the tension of the spring 36 thereby shifting the cranks 21 and 27 in a lateral direction so that when the lip 38 has reached the high portion of the cam 40 free wheeling will exist. Therefore, to effect a change to high speed it is necessary that the feet of the rider of the bicycle exert a pressure in a lateral direction so that the latching hook 41 on the crank 21 will engage with a spoke 42 of the sprocket wheel 24 thus in this manner locking the sprocket wheel with the pedal crank 27 and the bicycle on pedaling action will be driven at high speed. When it is desired to change from high to low speed, it is only necessary for the rider of the bicycle to stop pedaling and thus the spring 36 becomes active so that the lip 38 will lock with the abutment or shoulder 39 on the hub portion 30 of the gear 31 whence low speed will have been reached in the driving of the bicycle.

The pivot lug 50 has fitted thereto a coiled spring 63 which acts upon the elbow 51 to normally hold the same inwardly out of the path of the pedal crank 27 so that the brake will be normally inactive.

The outstruck casing 33 has fixed or fastened securely thereto a ring gear 64 which serves as a power medium for the planetary pinions 32 when engaged for low speed.

What is claimed is:

1. A bicycle comprising a frame having an axle housing, a pedal crank having an axle fitting said housing, a sprocket hub loose upon said axle and having a separable driving sprocket, a second pedal crank detachably fitted to the said axle, a disk fixed to said hub, a gear loose on said axle, planetary pinions concentrically journaled on the disk and enmesh with the said gear on the axle, a coiled expansion spring having abutment on said axle and also seated against said disk, a latching lip on the second pedal crank, an abutment shoulder on the said gear loose upon the axle and engageable by said latching lip, a cam face next to the shoulder on said gear and coacting with the latching lip so that when the pedal cranks are at a standstill the lip will ride the cam face disengaging it from the shoulder and freeing the gear on the axle, and a latching jaw on the first-mentioned pedal crank and engageable with the sprocket gear upon lateral movement of the axle for the locking of the hub carrying the sprocket directly with the axle.

2. A bicycle comprising a frame having an axle housing, a pedal crank having an axle fitting said housing, a sprocket hub loose upon said axle and having a separable driving sprocket, a second pedal crank detachably fitted to the said axle, a disk fixed to said hub, a gear loose on said axle, planetary pinions concentrically journaled on the disk and enmesh with the said gear on the axle, a coiled expansion spring having abutment on said axle and also seated against said disk, a latching lip on the second pedal crank, an abutment shoulder on the said gear loose upon the axle and engageable by said latching lip, a cam face next to the shoulder on said gear and coacting with the latching lip so that when the pedal cranks are at a standstill the lip will ride the cam face disengaging it from the shoulder and freeing the gear on the axle, a latching jaw on the first-mentioned pedal crank and engageable with the sprocket gear upon lateral movement of the axle for the locking of the hub carrying the sprocket directly with the axle, and foot pieces on said first- and second-named pedal cranks.

PASTOR REYES TORRES.